United States Patent
Rocher et al.

(10) Patent No.: US 11,415,688 B2
(45) Date of Patent: Aug. 16, 2022

(54) METHOD AND DEVICE FOR DETERMINING THE DISTANCE BETWEEN AN AIRBORNE RECEIVER AND A STATIONARY GROUND TRANSMITTER

(71) Applicant: MBDA FRANCE, Le Plessis-Robinson (FR)

(72) Inventors: Hélène Rocher, le Plessis-Robinson (FR); Pierre Garrigues, le Plessis-Robinson (FR)

(73) Assignee: MBDA FRANCE, Le Plessis-Robinson (FR)

( * ) Notice: Subject to any disclaimer, the term of this patent is extended or adjusted under 35 U.S.C. 154(b) by 765 days.

(21) Appl. No.: 15/764,167

(22) PCT Filed: Sep. 27, 2016

(86) PCT No.: PCT/FR2016/000152
§ 371 (c)(1),
(2) Date: Mar. 28, 2018

(87) PCT Pub. No.: WO2017/055692
PCT Pub. Date: Apr. 6, 2017

(65) Prior Publication Data
US 2018/0284253 A1 Oct. 4, 2018

(30) Foreign Application Priority Data
Oct. 2, 2015 (FR) ........................................ 1502052

(51) Int. Cl.
*G01S 11/12* (2006.01)
*F41G 7/22* (2006.01)
(Continued)

(52) U.S. Cl.
CPC .............. *G01S 11/12* (2013.01); *F41G 7/224* (2013.01); *G01S 3/782* (2013.01); *G01S 5/16* (2013.01); *G01S 7/495* (2013.01); *G01V 99/005* (2013.01)

(58) Field of Classification Search
CPC . G01S 11/12; G01S 5/16; G01S 7/495; G01S 3/782; F41G 7/22; F41G 7/224; G01V 99/00; G01V 99/005
See application file for complete search history.

(56) References Cited

U.S. PATENT DOCUMENTS 3,090,957 A * 5/1963 Beisel, Jr. ................. G01S 1/02
342/461
3,108,270 A * 10/1963 Fairbanks ............. G01S 7/4972
342/53
(Continued)

FOREIGN PATENT DOCUMENTS

FR 3017480 A1 8/2015

OTHER PUBLICATIONS

International Search Report dated Jan. 26, 2017, issued in International Application No. PCT/FR2016/000152, filed Sep. 27, 2016, 3 pages.
(Continued)

*Primary Examiner* — Alexander Satanovsky
*Assistant Examiner* — Lyudmila Zaykova-Feldman
(74) *Attorney, Agent, or Firm* — Christensen O'Connor Johnson Kindness PLLC

(57) ABSTRACT

A method and device for determining the distance between an airborne receiver and a stationary ground transmitter are disclosed. A digital terrain model is implemented to determine a range of distance values containing the transmitter. A receiver distance is found and, with the range of values, a plurality of theoretical distances is calculated, to each of
(Continued)

which a corresponding azimuth angle and elevation angle are associated. The thus calculated azimuth and elevation angles are compared to the measured azimuth and elevation angles of the line of sight under which the receiver observes the transmitter.

3 Claims, 2 Drawing Sheets

(51) Int. Cl.
*G01S 7/495* (2006.01)
*G01S 3/782* (2006.01)
*G01S 5/16* (2006.01)
*G01V 99/00* (2009.01)

(56) References Cited

U.S. PATENT DOCUMENTS

| | | | | |
|---|---|---|---|---|
| 3,261,014 A * | 7/1966 | Diaz | | G01S 13/86 |
| | | | | 342/53 |
| 3,320,420 A * | 5/1967 | Paglee | | G01S 13/685 |
| | | | | 250/342 |
| 3,378,842 A * | 4/1968 | Phillips | | G01S 11/04 |
| | | | | 342/458 |
| 4,612,441 A * | 9/1986 | Pardes | | G01S 11/12 |
| | | | | 250/342 |
| 4,698,638 A * | 10/1987 | Branigan | | F41G 7/008 |
| | | | | 342/53 |
| 4,954,837 A * | 9/1990 | Baird | | G01C 21/005 |
| | | | | 342/458 |
| 5,001,650 A * | 3/1991 | Francis | | G01S 3/7864 |
| | | | | 348/164 |
| 5,245,347 A * | 9/1993 | Bonta | | G01S 7/2813 |
| | | | | 342/149 |
| 5,969,676 A * | 10/1999 | Tran | | G01S 17/86 |
| | | | | 342/442 |
| 7,107,179 B2 | 9/2006 | Malchi et al. | | |
| 9,035,829 B2 * | 5/2015 | Raghupathy | | G01S 19/46 |
| | | | | 342/386 |
| 9,834,307 B2 * | 12/2017 | Rios | | G05D 1/0027 |
| 2004/0174290 A1 * | 9/2004 | Longbottom | | G01S 7/495 |
| | | | | 342/65 |
| 2007/0075182 A1 * | 4/2007 | Fetterly | | F41G 7/224 |
| | | | | 244/3.16 |
| 2007/0257831 A1 * | 11/2007 | Mathews | | G01S 5/021 |
| | | | | 342/22 |
| 2008/0074639 A1 * | 3/2008 | Donoghue | | G01S 19/50 |
| | | | | 356/4.08 |
| 2008/0191926 A1 | 8/2008 | Benayahu et al. | | |
| 2010/0000231 A1 * | 1/2010 | Meir | | G01S 7/495 |
| | | | | 62/3.7 |
| 2010/0235095 A1 * | 9/2010 | Smitherman | | G01S 19/14 |
| | | | | 701/532 |
| 2011/0309983 A1 * | 12/2011 | Holzer | | G01S 5/12 |
| | | | | 342/451 |
| 2013/0120192 A1 | 5/2013 | Larson | | |
| 2013/0179063 A1 * | 7/2013 | Herman | | G01S 11/12 |
| | | | | 701/300 |
| 2015/0219426 A1 * | 8/2015 | Moraites | | G06T 7/60 |
| | | | | 89/1.11 |
| 2015/0339930 A1 * | 11/2015 | McCann | | G08G 5/006 |
| | | | | 701/528 |
| 2016/0011318 A1 * | 1/2016 | Cohen | | G01S 19/29 |
| | | | | 342/357.26 |
| 2016/0259058 A1 * | 9/2016 | Verheggen | | G01S 7/4868 |
| 2016/0335504 A1 | 11/2016 | Midavaine et al. | | |
| 2016/0358026 A1 * | 12/2016 | Le Croller | | G06K 9/00973 |
| 2017/0003376 A1 * | 1/2017 | Wellman | | G01S 5/0221 |
| 2017/0225680 A1 * | 8/2017 | Huang | | B60T 7/22 |
| 2018/0017662 A1 * | 1/2018 | Colentier | | B64D 45/00 |

OTHER PUBLICATIONS

Written Opinion of the International Searching Authority dated Jan. 26, 2017, issued in International Application No. PCT/FR2016/000152, filed Sep. 27, 2016, 7 pages.
Written Opinion of the International Searching Authority dated Jan. 26, 2017, issued in International Application No. PCT/FR2016/000152, filed Sep. 27, 2016, 6 pages.
International Preliminary Report on Patentability dated Apr. 3, 2018, issued in International Application No. PCT/FR2016/000152, filed Sep. 27, 2016, 1 page.

* cited by examiner

METHOD AND DEVICE FOR DETERMINING THE DISTANCE BETWEEN AN AIRBORNE RECEIVER AND A STATIONARY GROUND TRANSMITTER

CROSS REFERENCES TO RELATED APPLICATIONS

This application is a national stage of PCT/FR2016/000152, filed on Sep. 27, 2016, which claims priority to French Application No. 1502052, filed Oct. 2, 2015.

TECHNICAL FIELD

The present invention relates to a method and a device for determining the distance between an airborne receiver in a known position and a stationary ground transmitter.

SUMMARY

Although the applications of this method can be diverse, the present invention is particularly appropriate to be implemented in a missile launch detector which is mounted on an aircraft (for example a plane or another missile) and of which the object is to protect said aircraft against a hostile attack missile launched from the ground. To do this, in a manner known, a missile launch detector comprises an infra-red imager (the airborne receiver) capable of detecting infra-red emissions (the stationary ground transmitter) produced by the propeller flame of said attack missile and of triggering an alarm on said aircraft to be protected.

The present invention will be more specifically described below in relation to a missile launch detector of this type.

The infra-red imager of a missile launch detector is able, by its line of sight, to indicate the direction from which the infra-red emission is produced by the launch of the attack missile, but cannot provide the distance separating the latter and the aircraft to be protected. Now, the field and sensitivity characteristics of said infra-red imager are heightened, in that it detects numerous infra-red sources other than the infra-red emissions produced by the launch of the attack missile which can result in false alarms. To avoid this last inconvenience, a missile launch detector must work in accordance with complex algorithms capable of eliminating these false alarms, or at least of reducing the number.

Of course, such complex algorithms are detrimental to the speed of the identification of a real alarm, which limits the time an aircraft to be protected has to react to the launch of a hostile attack missile.

The particular object of the present invention is to remedy these inconveniences by allowing a missile launch detector to quickly and precisely determine the distance separating it from an infra-red source.

So, thanks to the awareness of this distance, the missile launch detector can interpret the apparent infra-red strength (based on the distance) which it is receiving from said infra-red source and can determine the nature of the latter.

To that end, according to the invention, the method for determining the distance between an airborne receiver in a known position and a stationary ground transmitter is remarkable in that the following steps are implemented:

a) by implementation of a digital terrain model which is representative of the terrain on which said stationary transmitter can be found and which indicates the maximum and minimum height of the terrain, a maximum distance value and a minimum distance value can be determined defining a range of distance values in which the real value of the distance between said receiver and said transmitter can be found;

b) the value of the azimuth angle and the value of the elevation angle of the line of sight under which said receiver observes said transmitter are measured;

c) for each of a plurality of points of the part of said digital terrain model included in said range of distance values, the theoretical distance separating said point and said receiver is calculated, in addition to the values of the theoretical azimuth angle and the theoretical elevation angle of the direction of said theoretical distance;

d) the measured values of the azimuth angle and the elevation angle of said line of sight, obtained in step b), are compared respectively to each of the values of the theoretical azimuth angle and the theoretical elevation angle, obtained in step c); and e) it is considered that said real distance between the receiver and the transmitter is equal to the theoretical distance of said point on the digital terrain model of which the calculated values of the theoretical azimuth angle and the theoretical elevation angle of the direction are the closest respectively to the measured values of the azimuth angle and the elevation angle of said line of sight.

In the usual case where said airborne receiver is airborne and moves in a known manner on a known trajectory, steps a) to e) can be carried out for a plurality of successive points of said known trajectory in order to obtain a progression over time of said distance between said receiver and said transmitter.

However, this point-by-point construction of the progression over time of the distance between the receiver and the transmitter can lead to the inconvenience of including abnormal points in the case where, by exception, a measurement of the azimuth angle and/or the elevation angle would itself be abnormal.

To avoid this inconvenience, in a variant embodiment, the method in accordance with the present invention to continuously determine the distance between a moveable airborne receiver of known manner on a known trajectory and a stationary ground transmitter, said transmitter being observed by said receiver following a line of sight of variable direction upon movement of said transmitter, is remarkable in that it implements the following operations:

a') by implementation of a digital terrain model which is representative of the part of terrain on which said stationary transmitter is found and which indicates the maximum and minimum height of this part of the terrain, a maximum distance value and a minimum distance value is determined, for each of a plurality of successive positions of said airborne receiver over the entirety of its trajectory, defining a range of distance values in which the real value of the distance between said receiver and said transmitter at the corresponding position of said airborne receiver can be found;

b') at each of said successive positions of said airborne receiver, the value of the azimuth angle and the value of elevation angle of the corresponding direction of said line of sight is measured;

c') for each of a plurality of points of the part of said digital terrain model included in each of said ranges of distance values obtained in step a'), the theoretical distance between said point and said receiver is calculated, as well as the values of the theoretical azimuth value and the theoretical elevation angle of the direction of said theoretical distance;

d') the results of the measured values of the azimuth angle and the elevation angle for said line of sight, obtained in step b'), are respectively compared to the results of the values of the theoretical azimuth angle and the theoretical elevation angle obtained in step c'); and e') it is considered that the progression of the real distance between the receiver and the transmitter, while said receiver is moving along its trajectory, is represented by the progression of the theoretical distance calculated in step c'), for which the results of the values of the theoretical azimuth angle and the theoretical elevation angle are respectively the closest of the results of the measured values of the azimuth angle and the elevation angle of said line of sight.

Compared to the majority of distance measuring methods, such as triangulation, it will be noted that the accuracy of the determination of the distance between the transmitter and the receiver is independent of the speed of movement of the receiver, this accuracy being just as high for a low speed as for a higher speed of the latter.

The present invention also relates to an infra-red detection device:

which is mounted on board an aircraft equipped with a positioning device allowing the position of said aircraft to be known at every instance, and which comprises an infra-red detector capable of detecting a land-based infra-red emission, as well as measurement devices indicating the direction of the line of sight at which said infra-red detector observes said infra-red emission, this infra-red detection device being remarkable:

in that said means of measurement provide values of the azimuth angle and the elevation angle for the direction of said line of sight; and in that said detection device also comprises:

a digital terrain model which is representative of the terrain in which said land-based infra-red emission is found and which indicates the maximum and minimum height of said terrain; and configured means of calculation:

to calculate a minimum distance value and a maximum distance value between which the real value of the distance between said infra-red detector and said land-based infra-red emission is found;

to calculate a plurality of theoretical intermediate distances included between said minimum distance value and said maximum distance value;

to calculate, for each of said theoretical intermediate distances, the azimuth angle and the elevation angle of the corresponding direction; and to compare the calculated values of the azimuth angle and the elevation angle of each of said theoretical intermediate distances with the measured values of the azimuth angle and the elevation angle of the direction of said line of sight.

In an embodiment of the infra-red detection device in accordance with the present invention, said means of calculation are configured to assign, at any moment, the theoretical intermediate distance value of which the calculated values of the azimuth angle and the elevation angle are the closest respectively to the measured values of the azimuth angle and the elevation angle in the direction of said line of sight to the distance between the infra-red detector and said land-based infra-red emission.

Alternatively, said means of calculation are configured to assimilate the progression over time of the distance between the infra-red detector and said land-based infra-red emission into a progression over time of theoretical intermediate distance for which the results of the calculated values of the theoretical azimuth angle and the theoretical elevation angle are respectively the closest of the results of the measured values of the azimuth angle and the elevation angle of said line of sight.

It will be easily understood that the present invention also relates to a missile launch detection device comprising the particular features of the infra-red detection device described above, as well as an aircraft, particularly a missile, comprising such a missile launch detection device.

BRIEF DESCRIPTION OF THE DRAWINGS

The figures of the appended drawing will clearly detail how the invention can be implemented. In these figures, identical references indicate similar elements.

DETAILED DESCRIPTION

Figure 1:
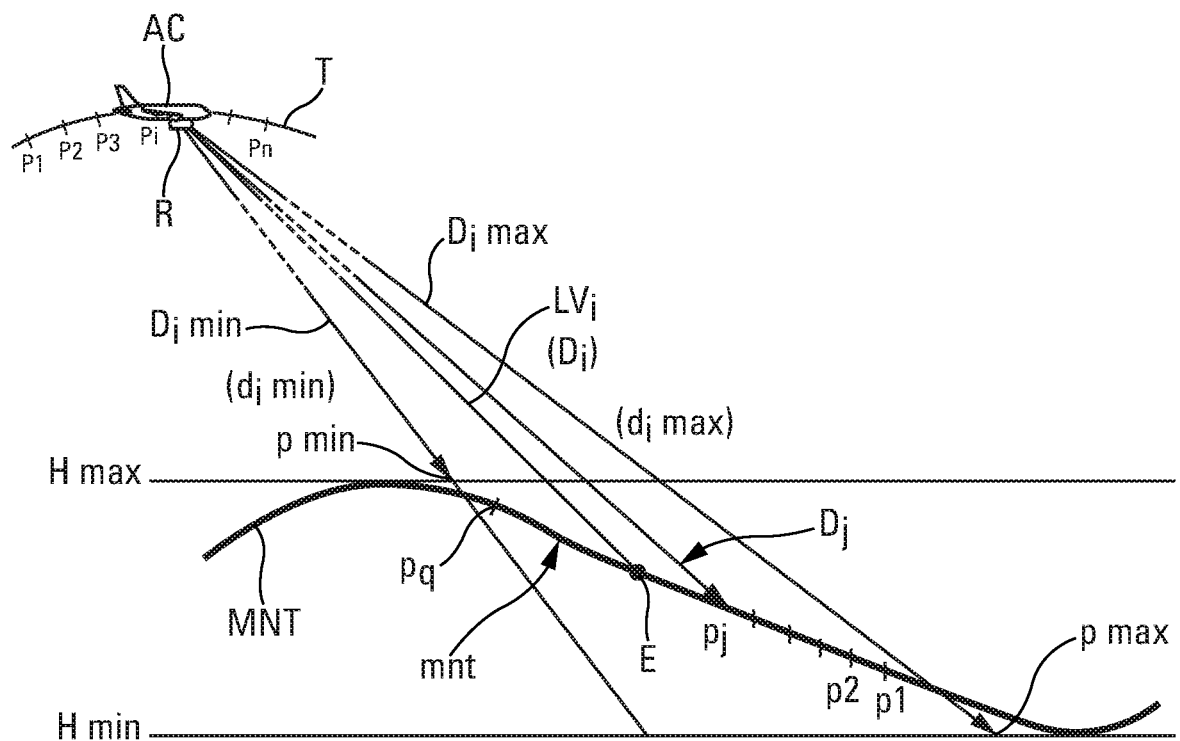
FIG. 1 is a diagram illustrating the foundation of the present invention.
Figure 2:
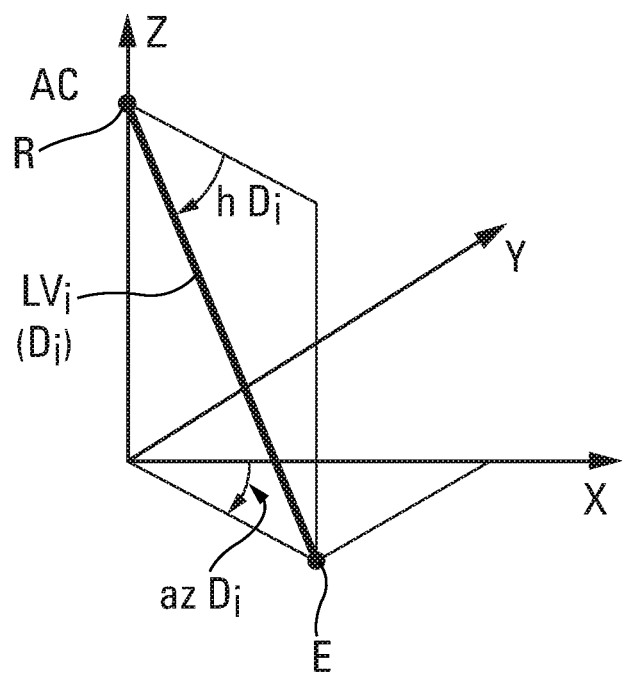
FIG. 2 illustrates the azimuth angle and the elevation angle of the line of sight of a receiver.

In FIG. 1, an aircraft AC has been schematically represented following a trajectory T and bearing an infra-red receiver R. At every instance ti (i=0, 1, 2, 3 . . . integer-n), the position Pi of the aircraft AC (and thus of the infra-red receiver R) is known to an accuracy $\Delta P$ in an X (latitude), Y (longitude) and Z (altitude) axis system, as shown in FIG. 2.

The aircraft AC flies over a terrain represented by a digital terrain model MNT, precision $\Delta MNT$, indicating the minimum altitude Hmin and the maximum altitude Hmax of said terrain. On this, an infra-red transmitter E observed by the infra-red receiver R in accordance with the line of sight LVi is found, while the aircraft AC is in position Pi. As shown in FIG. 2, the direction Di of the line of sight LVi can be defined by its elevation angle hDi and its azimuth angle azDi, to an accuracy $\Delta D$.

Due to the uncertainty $\Delta P$ of the accuracy of the position of the aircraft AC, of the uncertainty $\Delta MNT$ of the accuracy of the digital terrain model MNT, and the uncertainty $\Delta D$ of the accuracy of the direction Di of the line of sight LVi, this last direction Di can only be known as included between a maximum direction Dimax and a minimum direction Dimin.

As a result, the real distance between the receiver R and the transmitter E is included between a minimum distance Dimin, corresponding to the distance between the receiver R and the point pmin of intersection between the direction Dimin and the maximum altitude Hmax, and a maximum distance Dimax, corresponding to the distance between the receiver R and the point pmax of intersection between the direction Dimax and the minimum altitude Hmin. The real distance between the receiver R in position Pi and the transmitter E is thus included between Dimin and Dimax, which determines a range of distance $\Delta D$ values.

So, in accordance with the present invention, the first step is to determine, in the manner described above, the range of distance ΔD values in which the real value of the distance between the receiver R and the transmitter E at the position Pi is found.

Then, with the help of the instruments on board the aircraft AC, the value azDi of the azimuth angle and the value hDi of the elevation angle of the line of sight LVi of receiver R are measured.

Furthermore, for each of a plurality of points Pj (where j=2, 3, ..., j, integer-q) of the part mnt of the digital model MNT, included in said range of distance ΔD values, the theoretical distance dj between the point pj of the receiver R, as well as the values azj of the theoretical azimuth angle and hj of the theoretical elevation angle in the direction Dj of said theoretical distance dj, is calculated. Then, the measured values azDi and hDi of the azimuth angle and the elevation angle of the line of sight LVi are compared respectively with the calculated values azj and hj of the theoretical azimuth angle and the theoretical elevation angle for each of the directions Dj.

For the position Pi of the aircraft AC on its trajectory T, following this comparison, it can be considered that the real distance between the receiver R and the transmitter E is equal to that of the theoretical distances dj of which the direction Dj has the values azj of the theoretical azimuth angle and hj of the theoretical elevation angle respectively as the closest to the measured values azDi and hDi of the azimuth angle and the elevation angle of the line of sight LVi.

Of course, what has been described above for the position Pi of the aircraft AC may be repeated for each position $P_1$, $P_2$, ..., $P_n$ of this. Thus, a series of estimated values of the distance between transmitter E and receiver R is obtained according to the movement of the aircraft AC on its trajectory T.

Figure 3A:
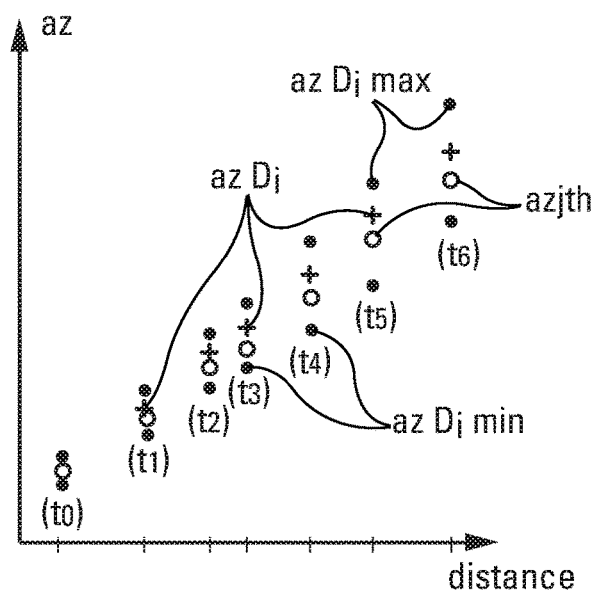
FIGS. 3A and 3B are chronological diagrams which respectively represent the progression of the azimuth angles and the elevation angles according to successive positions of the receiver.
Figure 3B:
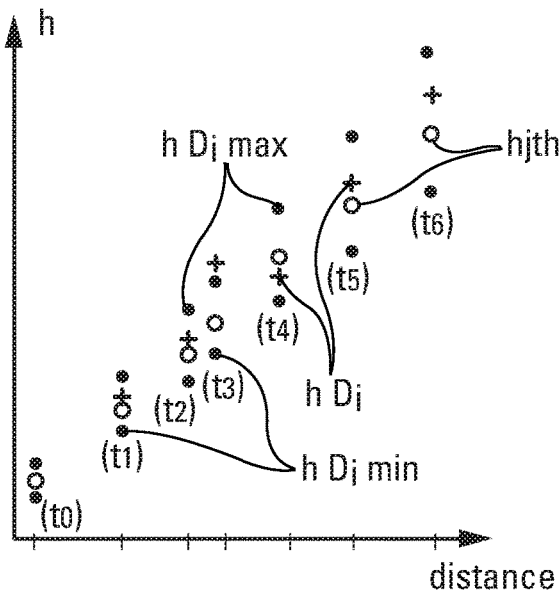

This process may be subject to measurement inaccuracies; a preferred variant of the method in accordance with the present invention is that, as shown in FIGS. 3A and 3B:

a') with the help of the digital terrain model MNT, a maximum distance value Dimax and a minimum distance Dimin is determined, for each of a plurality of successive positions Pi (at instances $t_0$, $t_1$, ..., $t_n$) of the receiver R, with the corresponding azimuth angles azdimax and azdimin and the corresponding elevation angles hdimax and hdimin, defining a range of distance values in which the real value of the distance between the receiver R and the transmitter E at the position Pi of the receiver R is found;

b') at each of the successive positions Pi of the receiver R, the value of the azimuth angle azDi and value of the elevation angle hDi of the corresponding direction of the line of sight LVi is measured;

c') for each of a plurality of points pj of the part mnt of the digital terrain model MNT, included in each of the ranges of distance values obtained in step a'), the theoretical distance dj between said point pj and the receiver R is calculated, as well as the values of the theoretical azimuth angle azth and the theoretical elevation angle hjth of the direction Dj of the theoretical distance dj;

d') the results of the measured values of the azimuth angle azDi and the elevation angle hDi, obtained in step b'), are respectively compared to the results of the theoretical azimuth angle azjth and the theoretical elevation angle hjth obtained in step c'); and e') it is estimated that the progression of the real distance between the receiver R and the transmitter E, while the aircraft AC moves along its trajectory, is represented by the progression of the theoretical distance dj, calculated in step c'), for which the results of the values of the theoretical azimuth angle azjth and the theoretical elevation angle hjth are respectively the closest of the results of the measured values of the azimuth angle azdi and the elevation angle hDi of the line of sight LVi.

Figure 4:
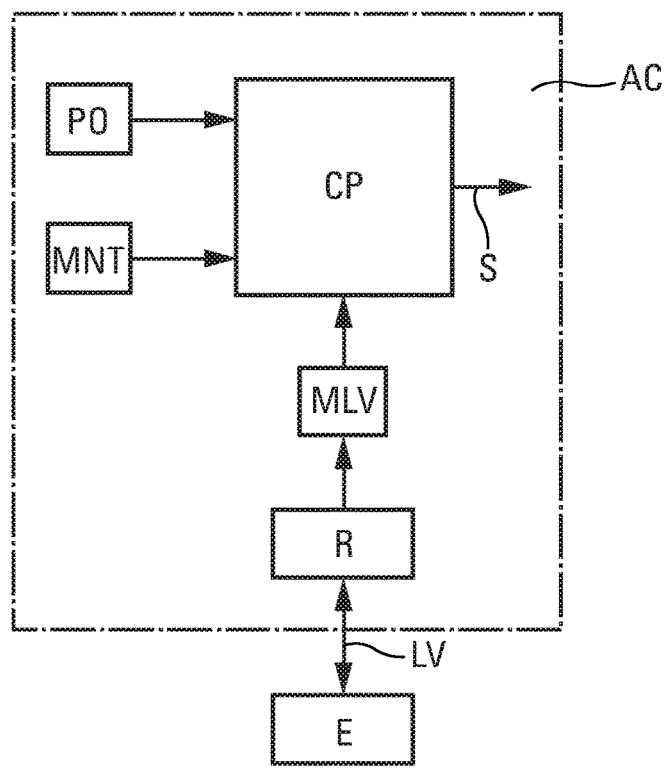
FIG. 4 is the synoptic diagram of the detection device in accordance with the present invention.

In FIG. 4, in accordance with the present invention, an infra-red detection device has been represented which is mounted on board the aircraft AC and which includes the receiver R, here in the form of an infra-red detector able to detect a land-based infra-red emission, formed here by the transmitter E. The aircraft AC comprises a positioning device PO which allows its position to be known at every instance and the infra-red detection device comprises measurement means MLV, indicating the direction of the line of sight LV under which the infra-red detector R observes the land-based infra-red emission E, this direction being defined by the azimuth angle and the elevation angle of the line of sight.

The infra-red detection device in FIG. 4 also comprises means of calculation CP, connected to the positioning device PO and to the measurement device MLV, as well as a digital terrain model MNT representative of the terrain on which the infra-red emission E is found and indicating the maximum elevation and the minimum elevation of the terrain, said digital terrain model also being connected to said means of calculation CP.

From the information received from the positioning device PO, the digital terrain model MNT and the measurement device MLV, the means of calculation CP are configured, in accordance with the present invention:

to calculate a minimum distance value and a maximum distance value between which the real value of the distance between said infra-red detector and said land-based infra-red emission is found;

to calculate a plurality of theoretical intermediate distances included between said minimum distance value and said maximum distance value;

to calculate for each of said theoretical intermediate distances, the azimuth angle and the elevation angle of the corresponding direction; and to compare the calculated values of the azimuth angle and the elevation angle of each of said theoretical intermediate distances with the measured values of the azimuth angle and the elevation angle in the direction of said line of sight.

As mentioned above, said means of calculation CP can be configured, to provide to their output S:

information attributing, at every instance, to the distance between the infra-red detector of said land-based infra-red emission, the value of the theoretical intermediate distance of which the calculated values of the azimuth angle and the elevation angle are the closest to the measured values of azimuth angle and the elevation angle in the direction of said line of sight; or information assimilating the progression over time of the distance between the infra-red detector of said land-based infra-red emission into a progression over time of a theoretical intermediate distance for which the calculated values of the theoretical azimuth angle and the theoretical elevation angle are respectively the closest of the results of the measured values of the azimuth angle and the elevation angle of said line of sight.

As detailed before, it appears that the infra-red detection device of FIG. 4 will find clear application in the detection of missile launches.

The invention claimed is:

1. A method performed by a missile launch detector mounted on an aircraft for continuous determination of a distance between a mobile airborne infra-red receiver on a known trajectory and a stationary ground transmitter producing infra-red emissions from a missile launch, said transmitter being observed by said airborne infra-red receiver following a line of sight of variable direction upon movement of said airborne infra-red receiver, the method comprising:

implementing a digital terrain model which is representative of terrain on which said stationary transmitter is found and which indicates a maximum elevation and a minimum elevation of this terrain, wherein implementing the digital terrain model includes determining a maximum distance value and a minimum distance value, for each of a plurality of successive positions of said airborne infra-red receiver for the entirety of its trajectory, and defining a range of distance values in which the real value of the distance between said airborne infra-red receiver and said transmitter in the corresponding position of said airborne infra-red receiver is found;

at each of said successive positions of said airborne infra-red receiver, measuring the value of the azimuth angle and the value of the elevation angle of the corresponding direction of said line of sight;

for each of a plurality of points of the part of said digital terrain model included in each of said ranges of distance values obtained in said implementing a digital terrain model, calculating a theoretical distance between said point and said airborne infra-red receiver, as well as the values of a theoretical azimuth angle and a theoretical elevation angle of the direction of said theoretical distance;

comparing the results of the measured values of the azimuth angle and the elevation angle to the results of the theoretical values of the azimuth angle and the theoretical elevation angle; and determining that a progression of the real distance between the airborne infra-red receiver and the transmitter, while said airborne infra-red receiver moves along its trajectory, is represented by a progression of the theoretical distance calculated in said calculating, for which the results of the values of the theoretical azimuth angle and the theoretical elevation angle are respectively the closest of the results of the measured azimuth angle and the elevation angle of said line of sight.

2. A missile launch detector for an aircraft, the missile launch detector comprising:

an infra-red detector configured to detect a land-based infra-red emission from a missile launch, and computer hardware programmed to, at least:

indicate the direction of a line of sight under which said infra-red detector observes said infra-red emission, calculate values of an azimuth angle and an elevation angle for the direction of said line of sight;

implement a digital terrain model which is representative of terrain on which said land-based infra-red emission is found and which indicates a maximum height and a minimum height of said terrain;

calculate a minimum distance value and a maximum distance value between which the real value of the distance between said infra-red detector and said land-based infra-red emission is found;

calculate a plurality of theoretical intermediate distances included between said minimum distance value and said maximum distance value;

calculate for each of said theoretical intermediate distances, the azimuth angle and the elevation angle of the corresponding direction;

compare the calculated values of the azimuth angle and the elevation angle of each of said theoretical intermediate distances with the measured values of the azimuth angle and the elevation angle of the direction of said line of sight;

attribute, at a plurality of time instances, the value of the theoretical intermediate distance of which the calculated values of the azimuth angle and the elevation angle are the closest of the measured values of the azimuth angle and the elevation angle of the direction of said line of sight to the distance between the infra-red detector and said land-based infra-red emission; and assimilate the progression over time of the distance between the infra-red detector and said land-based infra-red emission into a progression over time of theoretical intermediate distance for which the results of the calculated values of the theoretical azimuth angle and the theoretical elevation angle are respectively the closest of the results of the measured values of the azimuth angle and the elevation angle of said line of sight.

3. An aircraft equipped with a missile launch detector, the missile launch detector comprising:

an infra-red detector configured to detect a land-based infra-red emission from a missile launch, and computer hardware programmed to, at least:

indicate the direction of a line of sight under which said infra-red detector observes said infra-red emission, calculate values of an azimuth angle and an elevation angle for the direction of said line of sight;

implement a digital terrain model which is representative of terrain on which said land-based infra-red emission is found and which indicates a maximum height and a minimum height of said terrain;

calculate a minimum distance value and a maximum distance value between which the real value of the distance between said infra-red detector and said land-based infra-red emission is found;

calculate a plurality of theoretical intermediate distances included between said minimum distance value and said maximum distance value;

calculate for each of said theoretical intermediate distances, the azimuth angle and the elevation angle of the corresponding direction;

compare the calculated values of the azimuth angle and the elevation angle of each of said theoretical intermediate distances with the measured values of the azimuth angle and the elevation angle of the direction of said line of sight;

attribute, at a plurality of time instances, the value of the theoretical intermediate distance of which the calculated values of the azimuth angle and the elevation angle are the closest of the measured values of the azimuth angle and the elevation angle of the direction of said line of sight to the distance between the infra-red detector and said land-based infra-red emission; and assimilate the progression over time of the distance between the infra-red detector and said land-based infra-red emission into a progression over time of theoretical intermediate distance for which the results of the calculated values of the theoretical azimuth angle and the theoretical elevation angle are respectively the closest of the results of the measured values of the azimuth angle and the elevation angle of said line of sight.

* * * * *